US010486532B2

(12) United States Patent
Chapman et al.

(10) Patent No.: US 10,486,532 B2
(45) Date of Patent: Nov. 26, 2019

(54) REMOVABLE VEHICLE CONTROL

(71) Applicant: Ford Global Technologies, LLC, Dearborn, MI (US)

(72) Inventors: Robert Chapman, Commerce, MI (US); David Toppenberg, Ypsilanti, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 338 days.

(21) Appl. No.: 15/416,269

(22) Filed: Jan. 26, 2017

(65) Prior Publication Data

US 2018/0208210 A1  Jul. 26, 2018

(51) Int. Cl.

| B60W 50/08 | (2012.01) |
| B60W 10/04 | (2006.01) |
| B60W 10/18 | (2012.01) |
| B60W 10/20 | (2006.01) |
| B62D 1/183 | (2006.01) |
| G05D 1/00 | (2006.01) |
| B60K 37/06 | (2006.01) |
| B62D 1/10 | (2006.01) |

(52) U.S. Cl.
CPC ............ *B60K 37/06* (2013.01); *B62D 1/10* (2013.01); *B60K 2370/828* (2019.05); *B60K 2370/834* (2019.05)

(58) Field of Classification Search
None
See application file for complete search history.

(56) References Cited

U.S. PATENT DOCUMENTS

| 4,881,389 | A | * | 11/1989 | Alfon | B60R 25/0222 |
| | | | | | 70/209 |
| 5,454,238 | A | * | 10/1995 | Ross | B60R 25/02142 |
| | | | | | 70/186 |
| 5,897,133 | A | * | 4/1999 | Papandreou | B62D 1/10 |
| | | | | | 280/728.2 |
| 6,236,918 | B1 | | 5/2001 | Sonoda et al. | |
| 7,222,007 | B2 | * | 5/2007 | Xu | B60G 17/016 |
| | | | | | 180/252 |
| 7,553,173 | B2 | | 6/2009 | Kowalick | |
| 9,365,218 | B2 | | 6/2016 | Pallett et al. | |
| 9,802,638 | B1 | * | 10/2017 | Stoffel | B62D 1/00 |
| 2006/0071454 | A1 | | 4/2006 | Young et al. | |
| 2008/0262669 | A1 | | 10/2008 | Smid et al. | |

(Continued)

FOREIGN PATENT DOCUMENTS

| EP | 2918141 B1 | 1/2018 |
| JP | 2570824 B2 | 10/1996 |

OTHER PUBLICATIONS

GB Search Report dated Jun. 27, 2018 re GB Appl. No. 1801696.4.

*Primary Examiner* — Todd M Melton
*Assistant Examiner* — Jason R Roberson
(74) *Attorney, Agent, or Firm* — Frank A. MacKenzie; Bejin Bieneman PLC

(57) ABSTRACT

A system comprising a vehicle control device that includes a body fittable to a vehicle receptacle. An engagement pin is mounted to a side of the body, releasably lockable to a receptacle hole. A first electrical connector, mounted to a first end of the body, is mateable to an electrical connector, mounted to the receptacle, when the engagement pin is engaged. A steering wheel is releasably and rotatably engagable by a second end of the body.

20 Claims, 9 Drawing Sheets

(56) References Cited

U.S. PATENT DOCUMENTS

| | | | |
|---|---|---|---|
| 2010/0256844 A1* | 10/2010 | Ito | B63H 21/22 |
| | | | 701/21 |
| 2011/0080304 A1* | 4/2011 | Toledo | B62D 15/027 |
| | | | 340/932.2 |
| 2015/0060185 A1 | 3/2015 | Feguri | |
| 2016/0021178 A1 | 1/2016 | Liu et al. | |

* cited by examiner

REMOVABLE VEHICLE CONTROL

BACKGROUND

An autonomous vehicle, sometimes referred to as a self-driving vehicle, may operate partially or entirely without user intervention. For example, a vehicle computer may control vehicle operations such as steering, acceleration, braking, etc. Thus, an autonomous vehicle may lack one or more of a vehicle steering wheel, a brake pedal, etc.

DETAILED DESCRIPTION

Introduction

Figure 1A:
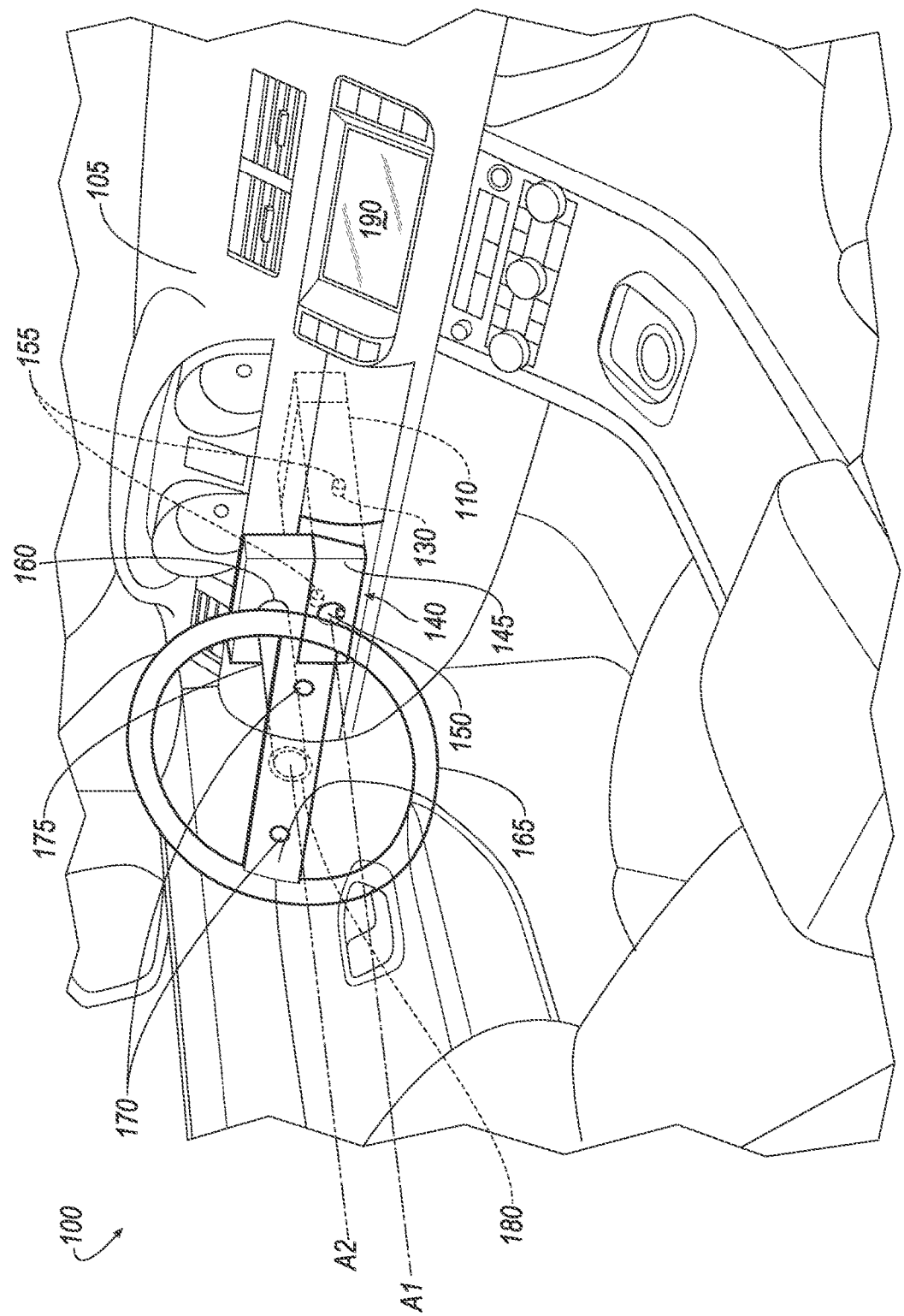
FIG. 1A is a perspective view of an example vehicle control device attached to a vehicle instrument panel.
Figure 1B:
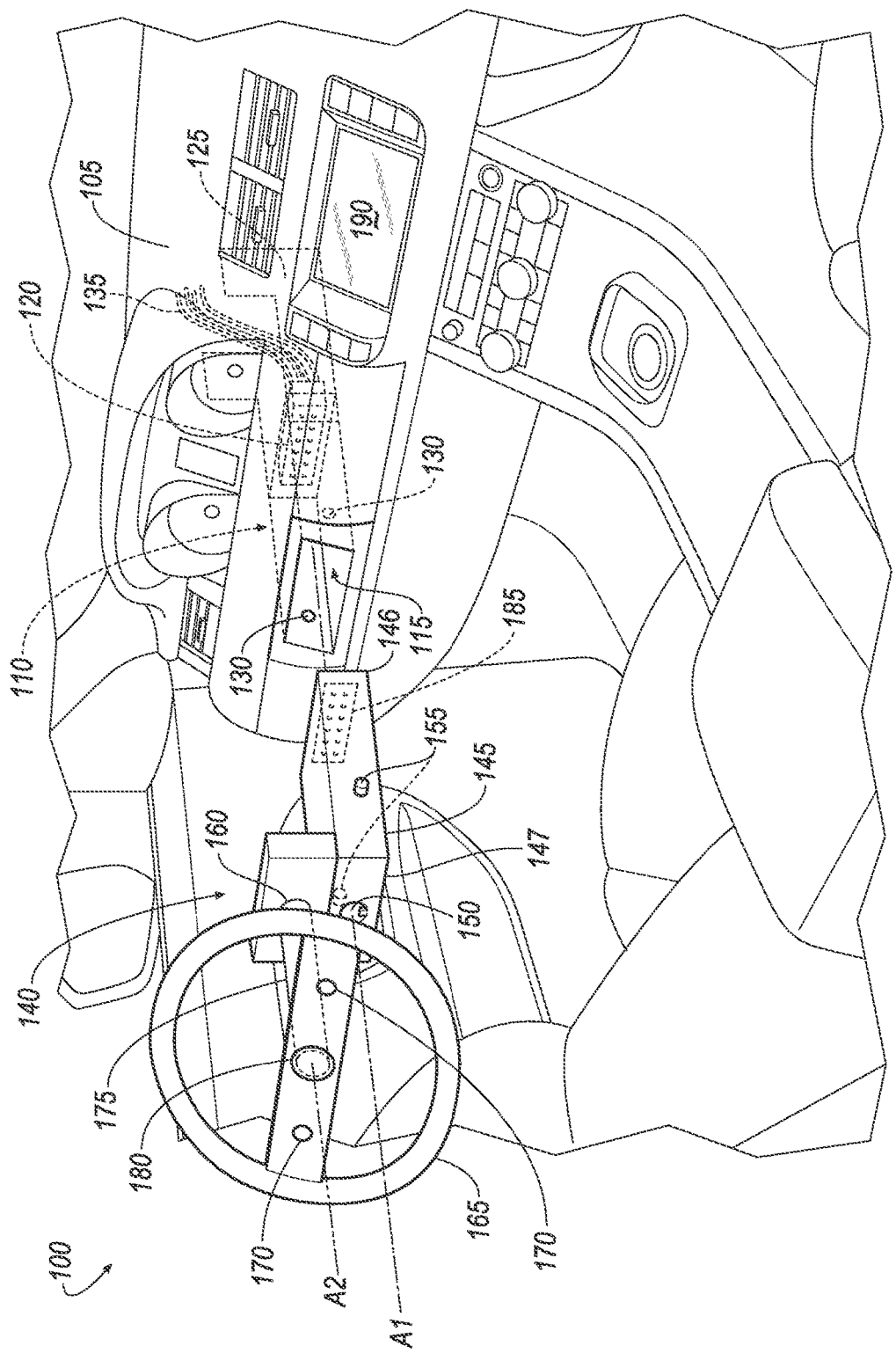
FIG. 1B is a perspective view of the vehicle control device of FIG. 1A detached from the vehicle instrument panel.

Referring to FIGS. 1A-1B, a control device 140 for a vehicle 100 includes a body 145 fittable to, i.e., at least partially within, a vehicle 100 receptacle 110. An engagement pin 155, mounted to a side wall 111 of the body 145, is releasably lockable to a receptacle 110 locking hole 130. The control device 140 includes a first electrical connector 185 mounted to a first end 146 of the body 145 and engagable by a receptacle 110 second electrical connector 120 when the engagement pin 155 is locked. The control device 140 includes a steering wheel 165 releasably and rotatably engagable by a second end 147 of the body 145.

Exemplary System Elements

Figure 2:
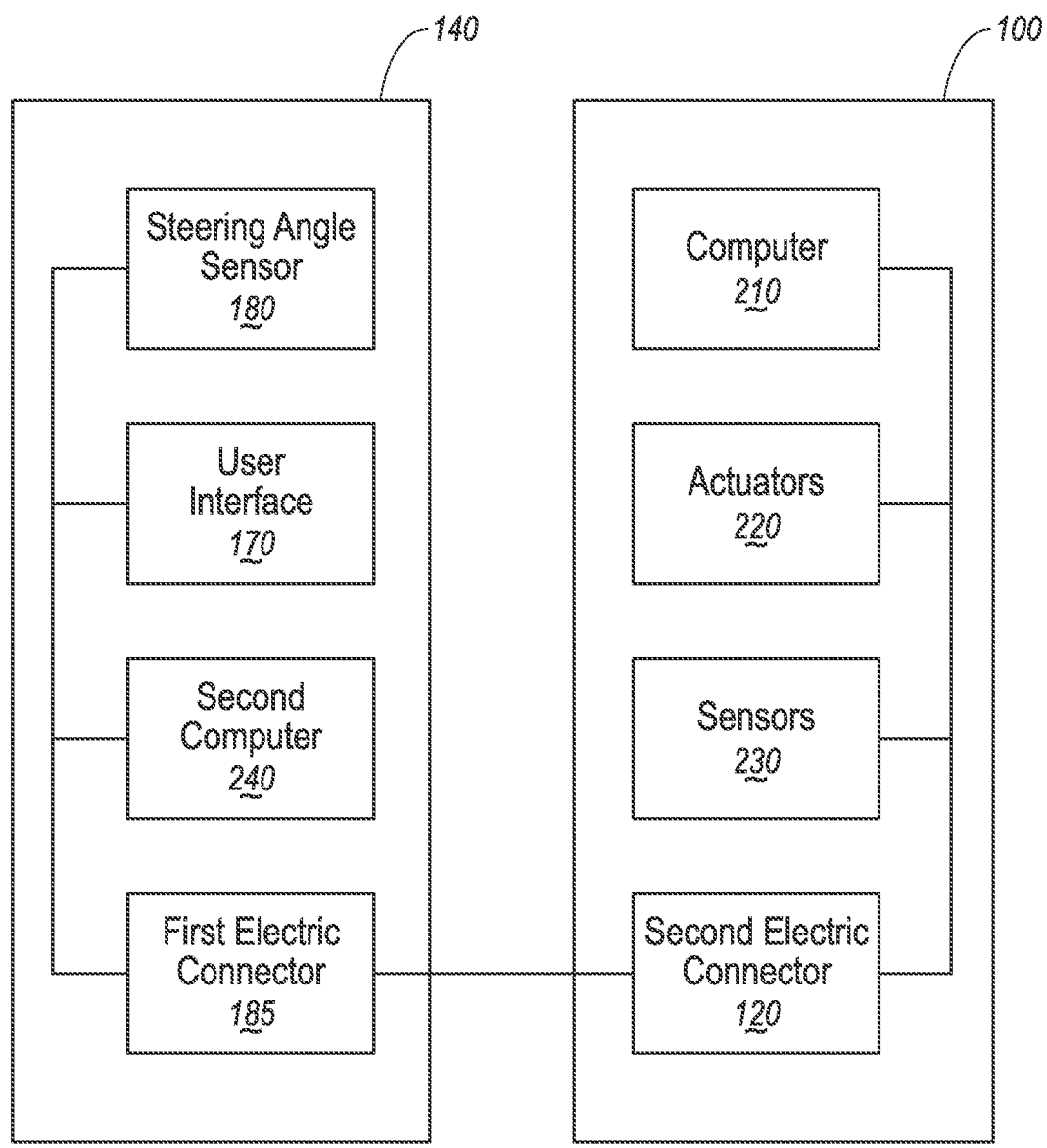
FIG. 2 is a block diagram showing electrical components of the vehicle and vehicle control device of FIGS. 1A-1B.

FIGS. 1A-1B and 2 show an example control device 140 for a vehicle 100 and a vehicle 100 instrumentation panel (IP) 105. FIG. 1A shows the control device 140 attached to an example control device 140 receptacle 110 disposed within the vehicle 100 IP 105. FIG. 1B, on the other hand, shows the control device 140 removed from the receptacle 110. The control device 140 includes a body 145 fittable to the receptacle 110.

An engagement pin 155 is mounted to a side wall 111 of the body 145. The engagement pin 155 is releasably lockable to a receptacle 110 locking hole 130. "Releasably lockable," in the context of this disclosure, means "having a locked and an unlocked (or released) position." The engagement pin 155 accordingly may be movable between a locked position and an unlocked (or released) position. As an example, moving between the locked and released positions may include rotating a key in a lock 150, pushing/pulling the device 140 to/away from the receptacle 110, or a combination thereof.

The control device 140 includes a first or device electrical connector 185 mounted to a first end 146 of the body 145. The device electrical connector 185 is mateable to a second or receptacle electrical connector 120 (best seen in FIG. 1B) when the engagement pin 155 is locked. The vehicle control device 140 further includes or is connectable to a steering wheel 165 releasably and rotatably engagable at a second end 147 of the body 145.

FIG. 1A illustrates a portion of a vehicle 100 interior. The vehicle 100 may be powered in a variety of known ways, e.g., with an electric motor and/or internal combustion engine. The vehicle 100 may be a land vehicle such as a car, truck, etc. As depicted in FIG. 2, a vehicle 100 may include a computer 210, actuator(s) 220, and sensor(s) 230.

The computer 210 includes a processor and a memory such as are known. The memory includes one or more forms of computer-readable media, and stores instructions executable by the computer 210 for performing various operations, including as disclosed herein.

The computer 210 may operate the vehicle 100 in an autonomous, semi-autonomous mode, or non-autonomous mode. For purposes of this disclosure, an autonomous mode is defined as one in which each of vehicle 100 propulsion, braking, and steering are controlled by the computer 210; in a semi-autonomous mode the computer 210 controls one or two of vehicles 100 propulsion, braking, and steering; in a non-autonomous mode, an operator controls the vehicle 100 propulsion, braking, and steering.

The computer 210 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 210, as opposed to a human operator, is to control such operations. Additionally, the computer 210 may be programmed to determine whether and when a human operator is to control such operations.

The computer 210 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 210 is generally arranged for communications on a vehicle communication network that can include a bus in the vehicle such as a controller area network (CAN) or the like, and/or other wired and/or wireless mechanisms.

Via the vehicle 100 network, the computer 210 may transmit messages to various devices in the vehicle and/or receive messages from the various devices, e.g., an actuator 220, a user interface 170, etc. Alternatively or additionally, in cases where the computer 210 actually comprises multiple devices, the vehicle 100 communication network may be used for communications between devices represented as the computer 210 in this disclosure. Further, as mentioned below, various controllers and/or sensors may provide data to the computer 210 via the vehicle communication network.

The vehicle 100 actuators 220 are implemented via circuits, chips, or other electronic and or mechanical components that can actuate various vehicle subsystems in accordance with appropriate control signals as is known. The actuators 220 may be used to control braking, acceleration, and steering of the vehicles 100.

Vehicle 100 sensors 230 may include a variety of devices known to provide data via the vehicle communications bus. For example, the sensors may include one or more cameras, radars, and/or Light Detection and Ranging (LIDAR) sensors 230 disposed in and/or on the vehicle 100 providing data encompassing at least some of the vehicle 100 exterior. A vehicle 100 computer 210 may receive the object data and operate the vehicle in an autonomous and/or semi-autonomous mode based at least in part on the received object data.

User interface device(s) 190 may be configured to receive information from a user, such as a human operator, during operation of the vehicle. For example, a user may select a mode of operation, e.g., an autonomous mode, by inputting a requested mode of operation via a user interface device. Moreover, a user interface device may be configured to present information to the user. Thus, a user interface device may be located in a passenger compartment of the vehicle 100. In an example, the computer 210 may output information indicating that a vehicle 100 mode of operation such as an autonomous mode is deactivated due to an event, e.g., a vehicle 100 sensor 230 failure.

An autonomous vehicle 100 may lack a steering wheel, an accelerator and/or brake pedal because a computer 210 may operate the vehicle 100 without a user input. However, in various conditions such as a failure in a sensor 230, a computer 210, etc., and/or during maintenance or repair in a service center, etc., an autonomous vehicle 100 may be operated in a non-autonomous mode. Thus, user inputs including a steering angle, an acceleration request, and/or a brake pressure may be necessary. The control device 140 may be attached to the vehicle 100 receptacle 110 as a means for a user to provide such inputs. Thus, a user may steer, accelerate, and/or decelerate the vehicle 100 via the control device 140.

Figure 3:
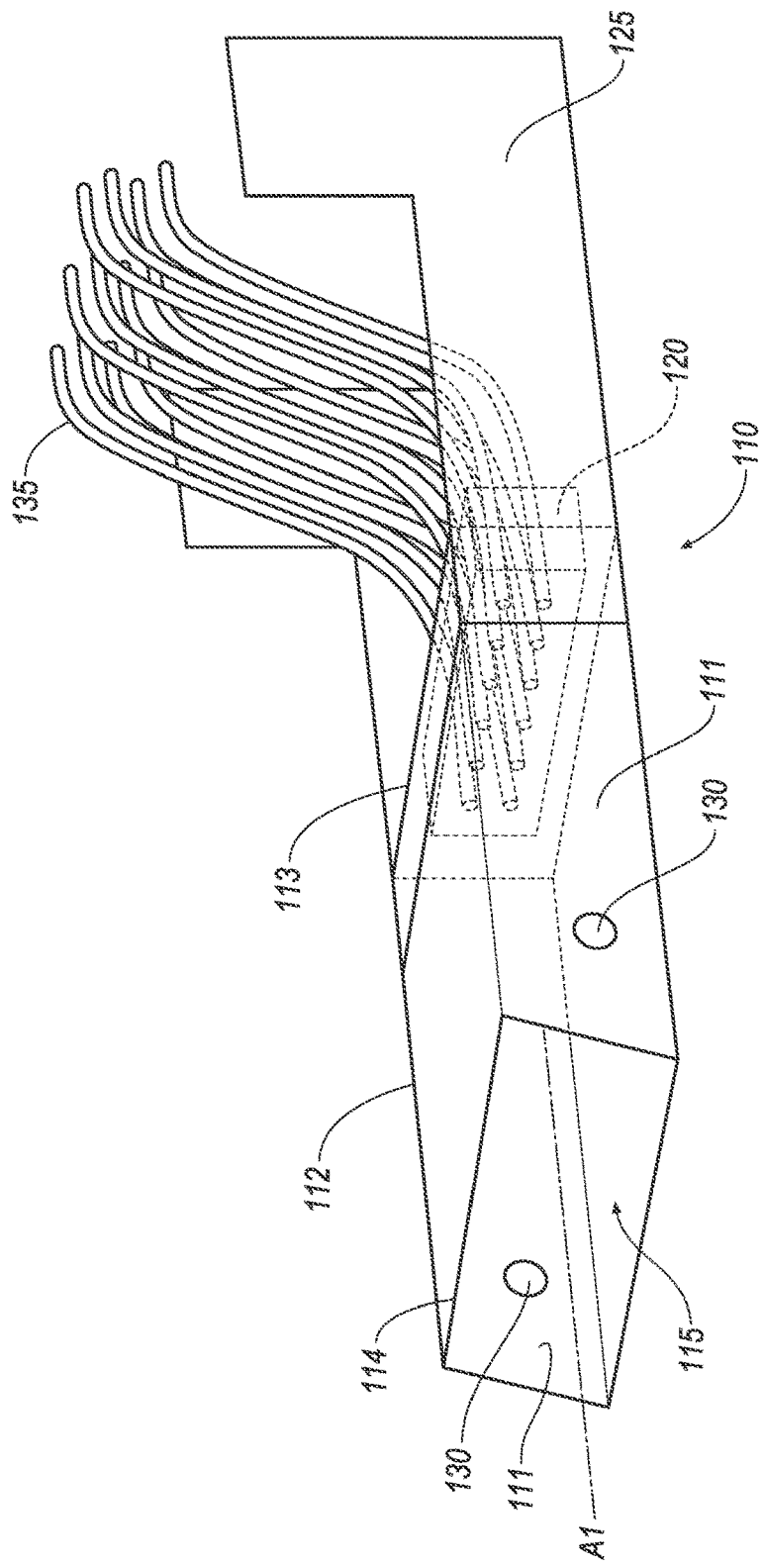
FIG. 3 is a perspective view of an example control device receptacle.

To attach the control device 140 to, e.g., the vehicle 100 IP 105, the vehicle 100 may include a receptacle 110, as shown in FIGS. 1A-1B and 3. An example receptacle 110 includes walls 111 defining the cavity 112 with an opening 115 and an anchor 125. The opening 115 is a hollow opening and may have a rectangular, triangular, circular, etc. cross section. The cavity 112 may have a first or interior end 113, a second or cabin-facing end 114, and walls 111. The hollow cavity 112 allows for inserting the control device 140 into the receptacle 110 via the opening 115. By mechanically engaging, e.g., when the engagement pins 155 are locked in place, the control device 140 to the receptacle 110, the control device 140 may be immobile relative to the receptacle 110. Additionally or alternatively, the cavity 112, e.g., the walls 111 thereof, may include grooves, ribs, ridges, protrusions, etc. (not shown) to improve an alignment of the control device 140 relative to the receptacle 110. The control device 140 can be inserted into the receptacle 110 opening 115.

The receptacle 110 may be mechanically supported by, e.g., a beam of a vehicle 100 frame. In one example, the receptacle 110 anchor 125 may attach the receptacle 110 at the cavity 112 end 113 to a vehicle 100 beam, e.g., behind the IP 105. The receptacle 110 may be formed of metal, hard plastic, etc.

In one example, the receptacle 110 may include a locking means which in one example are hole(s) 130 on the side walls 111 to mechanically engage the control device 140 with the receptacle 110. The control device 140 may include engagement pins 155 that may releasably lock the control device 140 to the receptacle 110. The receptacle 110 may include one or more holes 130.

To electrically couple the receptacle 110 to the control device 140, the receptacle 110 may include a second electric connector 120 mounted to a cavity 112 end 113. To provide electrical connection between the control device 140 and electrical components of the vehicle 100, a vehicle 100 wiring harness 135 may be electrically connected to the receptacle electric connector 120.

Figure 4:
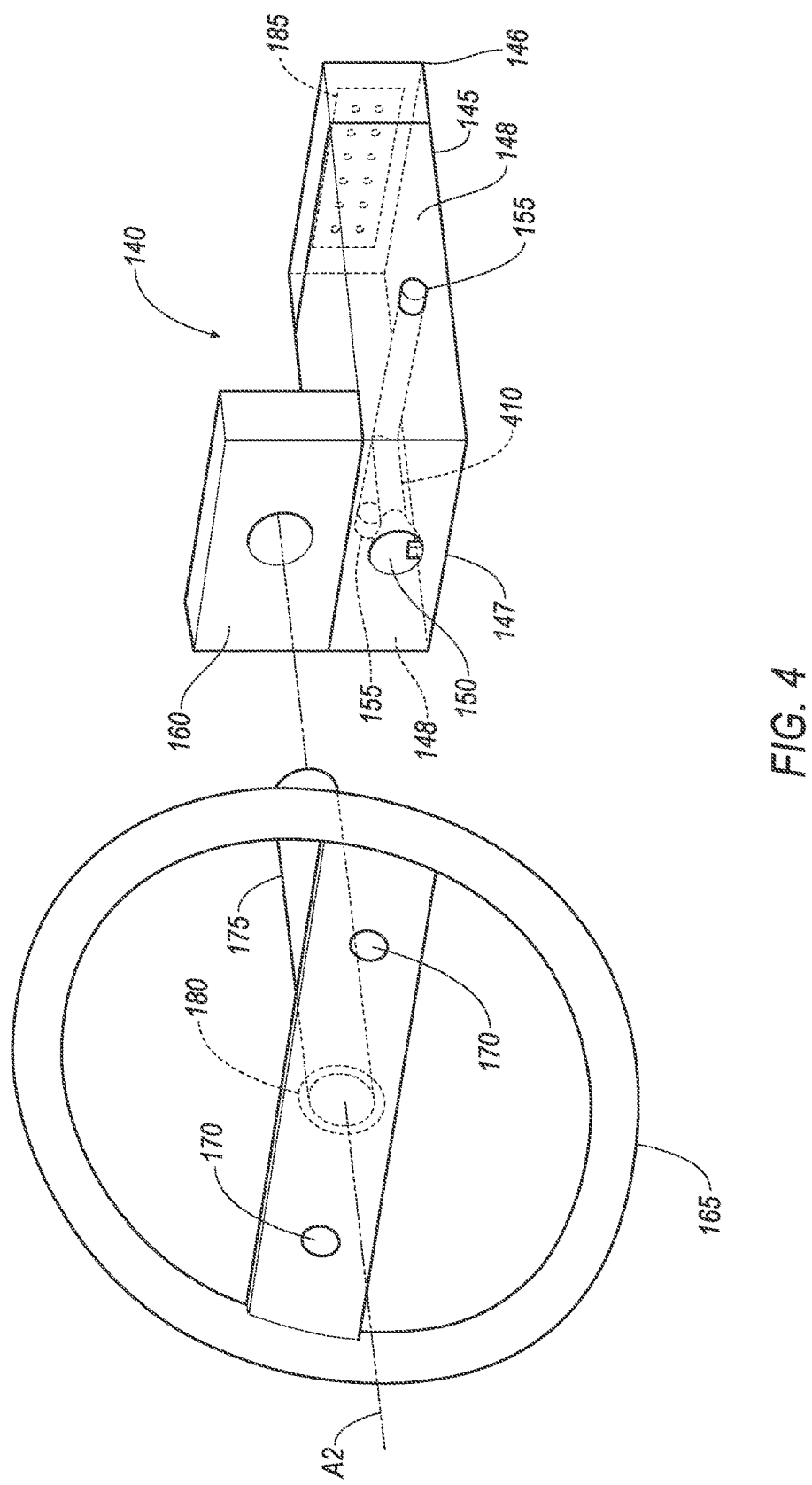
FIG. 4 is a perspective view of an example vehicle control device.

As shown in FIGS. 1A-1B and 4, an example control device 140 may include a body 145, a steering column 175, and a steering wheel 165. The control device 140 body 145 may be mechanically and electrically engagable by the receptacle 110.

The control device 140 body 145 may have rectangular, triangular, circular, etc. solid shape, i.e., a shape fittable to the opening 115 of the receptacle 110. The body 145 may have a first or interior end 146, a second or cabin-facing end 147, and sides 148. In one example, size and shape of the body 145 and the receptacle 110 are respectively provided such that the control device 140 body 145, when inserted, cannot rotate about a longitudinal axis A1 of the receptacle 110.

In one example, the control device 140 body 145 may not move relative to the receptacle 110 when locked, e.g., by the control device 140 engagement pins 155 and receptacle 110 holes 130. For example, the control device 140 may include a lock 150 at the interior end 146 to lock and/or unlock the control device 140 to the receptacle 110, e.g., preventing a decoupling of the control device 140 from the receptacle 110. For example, the control device 140 may include a linkage 410 mechanically engaging the lock 150 and the engagement pins 155. For example, the linkage 410 may include metal rods, mechanical couplings, etc. that mechanically couple a key inserted in the lock 150 to the engagement pins 155. A linkage 410 may convert a rotational movement of a key in the lock 150 to a linear movement of the engagement pins 155. In one example, via a rotation of a key in the lock 150 the engagement pins 155 may be moved from a locked position to an unlocked position inside the body 145, e.g., between the body 145 sides 148, to unlock the body 145 engagement pins 155 from the receptacle 110 holes 130. Additionally or alternatively, the receptacle 110 may include springs that bias the engagement pins 155 outward, e.g., away from the body 145 sides 148. Thus, when the control device 140 is inserted in the receptacle 110, the engagement pins 155 may be pushed out to enter the holes 130 (e.g., the locked position).

The control device 140 may include a steering wheel connector 160, mounted to the body 145 second end 147, to mechanically and electrically couple the steering wheel 165 to the body 145. For example, a steering wheel connector 160 may include a mechanical coupling to couple the steering column 175 to the control device 140 body 145 end 147. In one example, the steering wheel connector 160 may include releasably lockable coupling(s) that allow a release and/or attachment of the steering column 175 from/to the body 145. Additionally or alternatively, a mechanical coupling between the steering wheel 165 and the steering column 175 may be releasably lockable, e.g., via a click locking mechanism, screws, etc. To steer the vehicle 100, e.g., in a non-autonomous mode, a user may rotate the steering wheel 165 relative to the control device 140 body 145. In one example, the steering wheel 165 is rotatably coupled to the steering column 175 while the steering column 175 is fixed relative to the control device 140 body 145. For example, the steering column 175 may be releasably engagable by the steering wheel connector 160, e.g., via a locking mechanism. In one example, the longitudinal axis A1 of the receptacle is substantially parallel to a second longitudinal axis A2 of the steering wheel. Alternatively, the axes A1, A2 may be transverse, e.g., the axis A1 may be perpendicular to a vehicle 100 roof.

The steering wheel 165 may include user interface(s) 170, e.g., push buttons, touch screen, lever, speaker, display, etc. In one example, a user may input an acceleration and/or deceleration request via the user interface(s) 170, e.g., by pressing a push button user interface 170.

In order to steer the vehicle 100, in one example, the steering wheel 165 may provide a steer-by-wire means, such as is known, e.g., via the steering sensor 180 and other electronic components such as the vehicle 100 computer 210. In order to determine a steering angle of the steering wheel 165, in one example, the control device 140 may include a steering angle sensor 180 that is rotationally engagable by the second end 147 of the body 145. For example, the steering angle sensor 180 may be rotationally engaging the steering wheel 165 and the steering column 175. The steering angle sensor 180 may determine a steering angle and/or a change of steering angle. In one example, the steering angle sensor 180 may include a mechanical coupling such as a bearing and an electronic component, e.g., an optical sensor, a resistive transducer, etc., to measure a steering angle. Additionally or alternatively, the steering angle sensor 180 may be rotationally mounted between the steering wheel connector 160 and the steering column 175. Additionally, the steering column 175 may include wiring to connect the steering angle sensor 180 and steering wheel 165 user interfaces 170 to the control device 140 first electric connector 185.

The control device 140 first electric connector 185 may be mounted to a first end 146 of the control device 140 body 145. The device electric connector 185 may be aligned with the receptacle 110 second electric connector 120 when the control device 140 body 145 is inserted in the receptacle 110. When the device 140 is completely inserted in the receptacle 110, the first and second electric connectors 185, 120 are then mated and electrically coupled to one another.

With reference to FIGS. 1A, 1B, 2, 3 and 4, the control device 140 may include a second computer 240. In one example, the second computer 240 is programmed to receive data from the steering wheel 165 and/or the user interface(s) 170, and output the received data to the vehicle 100 computer 210. In one example, the received data may include an acceleration and/or a brake request. In another example, the second computer 240 may be programmed to authenticate the control device 140 to the vehicle 100 computer 210. Additionally or alternately, the second computer 240 may be programmed to authenticate the control device 140 and to output a steering angle to the vehicle 100 computer 210. Additionally or alternatively, the vehicle 100 computer 210 may decline to provide/receive data from/to the control device 140 second computer 240, if an authentication fails, e.g., the second computer 240 outputs an unexpected password to the vehicle 100 computer 210. In another example, the control device 140 may lack a second computer 240 and the vehicle 100 computer 210 may directly receive data from the control device 140 steering angle sensor 180, and/or other electronic components of the control device 140.

Figure 5:
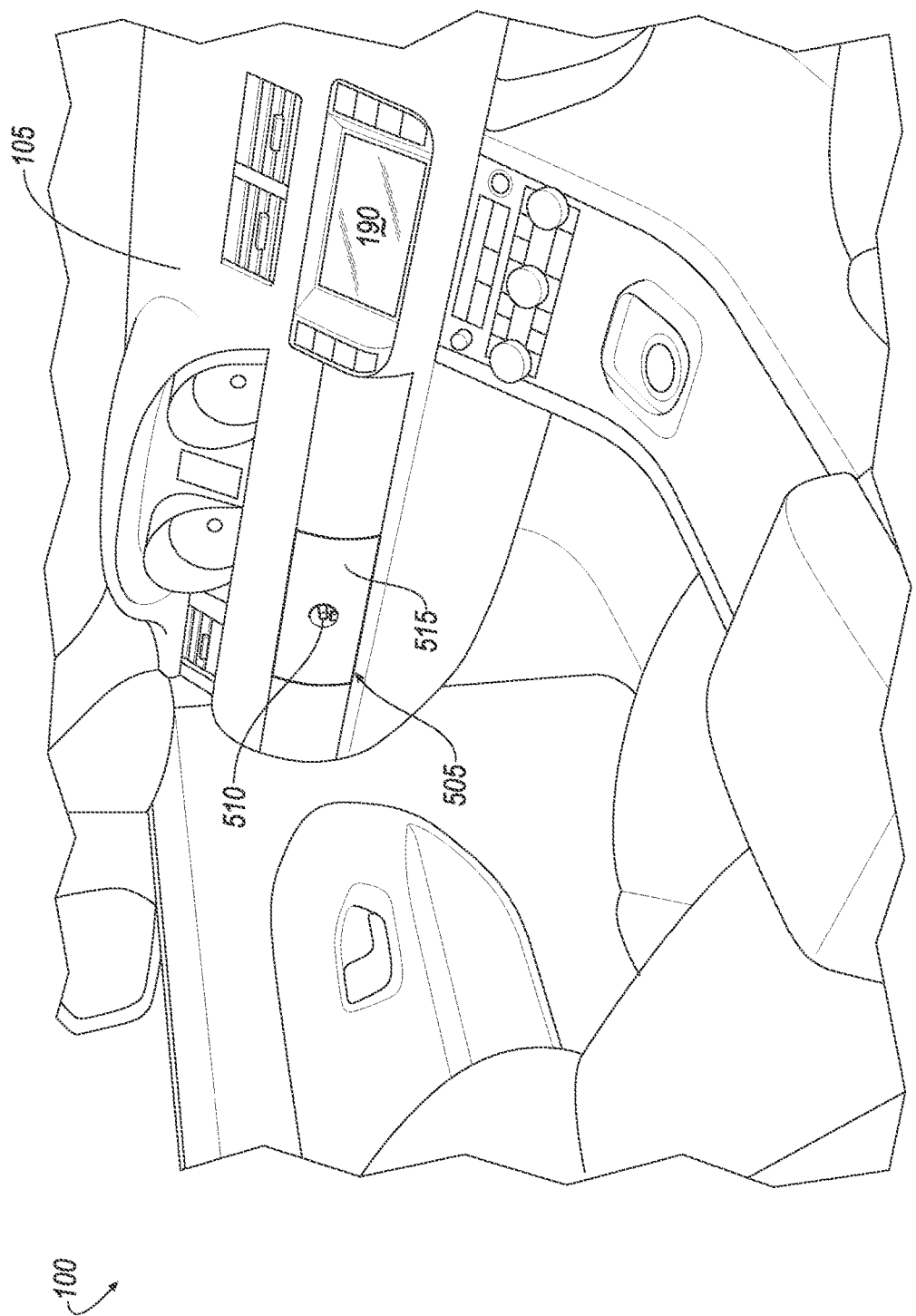
FIG. 5 is a perspective view of an example vehicle instrument panel with a cap attached to the control device receptacle.

In one example, as shown in FIG. 5, a cap 505 may be coupled to the receptacle 110, e.g., when the vehicle 100 is in an autonomous mode and/or a control device 140 is not coupled to the receptacle 110. In another example, as shown in FIG. 6, a user may remove (decouple) the cap 505 from the receptacle 110, e.g., in order to attach the control device 140 to the receptacle 110.

Figure 6:
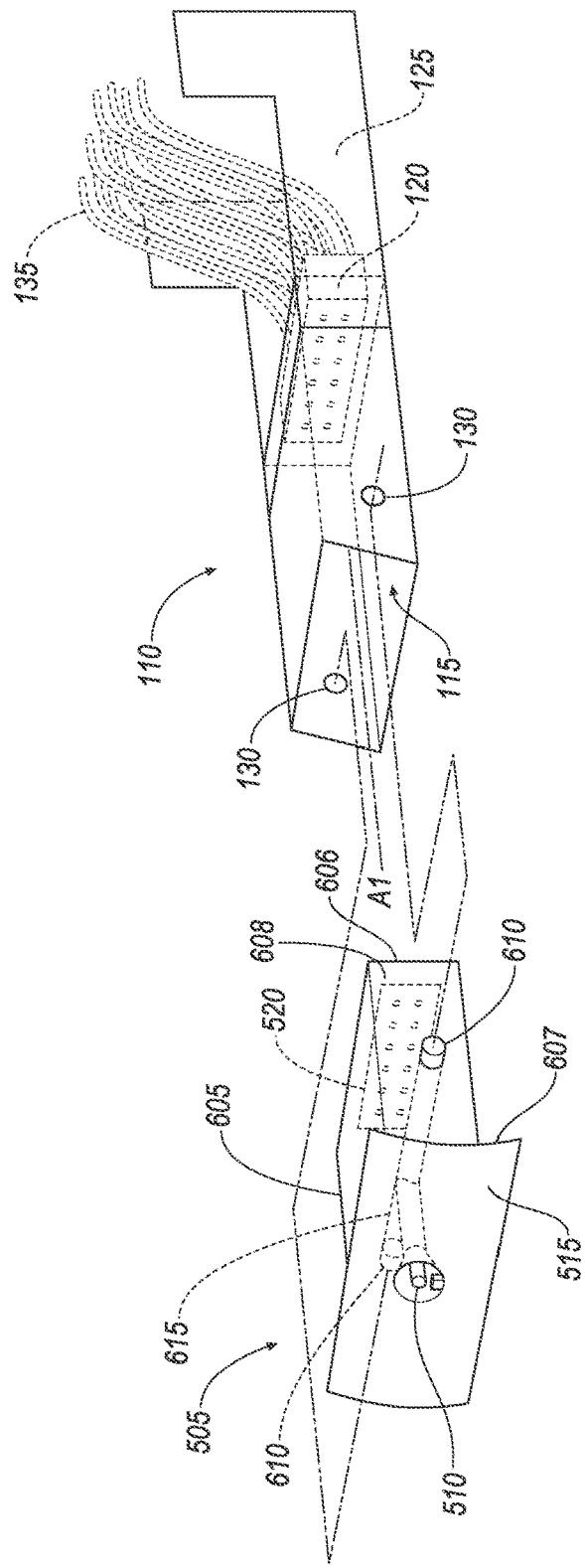
FIG. 6 is a perspective view of the cap of FIG. 5 detached from the control device receptacle.

With reference to FIGS. 5 and 6, the cap 505 may include a body 605 having a size and a shape, e.g., rectangular, such that the cap 505 can frictionally engage the receptacle 110 opening 115. The cap 505 body 605 may have a first end 606, a second end 607, and sides 608. In one example, as an alternative to or in addition to friction, to secure the cap 505 to the receptacle 110 opening 115, the cap 505 may include cap pin(s) 610 to lock the cap 505 to the receptacle 110, e.g., to prevent a decoupling of the cap 505 from the receptacle 110 while driving.

The cap 505 may include a lock 510 to secure the cap 505 to the receptacle 110, e.g., to pull the cap pins 610 inside the body 605 to release the cap 505 from the receptacle 110. In one example, the cap 505 may include a second linkage 615 to mechanically couple the lock 510 and the cap pins 610 of the cap 505. Thus, a user may unlock the cap 505 via the lock 510 by using a key. In one example, a second linkage 615 may include metal rods, mechanical couplings, etc. that mechanically couple a key inserted in the lock 510 to the cap pin(s) 610. A second linkage 615 may convert a rotational movement of a key in the lock 510 to a linear movement of the cap pin(s) 610. Additionally or alternatively, other means may be used to lock and/or unlock the cap 505. The cap 505 may include a decorative cover 515 mounted to the body 605 second end 607 that may be flush with an IP 105 surface when the cap 505 is coupled to the receptacle 110.

In one example, the cap 505 may include an end electric connector 520, mounted to the cap 505 first end 606, electrically engagable by the receptacle 110 second electric connector 120. In one example, the end electric connector 520 may include electrical circuit and/or electrical components electrically interconnecting two or more of electric contacts of the end electric connector 520. The vehicle 100 computer 210 may be programmed to determine whether the receptacle 110 is coupled to the cap 505 by monitoring a connection of the cap 505 end electrical connector 520 and the receptacle 110 second electrical connector 120. For example, the vehicle 100 computer 210 may be programmed to output electrical voltage to the end electric connector 520 and determine whether the end electric connector 520 is electrically engaged with the first electric connector 185. The vehicle 100 computer 210 may be programmed to determine whether the receptacle 110 is coupled to the cap 505 by outputting a voltage to the cap 505 end electrical connector 520 and measuring a current flowing therethrough. For example, the computer 210 may be programmed to determine that the cap 505 is attached to the receptacle upon detecting a short circuit between two contacts of the end electric connector 520. Additionally or alternatively, the vehicle 100 computer 210 may be programmed to deactivate an autonomous mode of the vehicle 100 upon determining that the end electric connector 520 is electrically decoupled from the receptacle 110 second electric connector 120, i.e., the receptacle is in a disengaged state.

Processing

Figure 7:
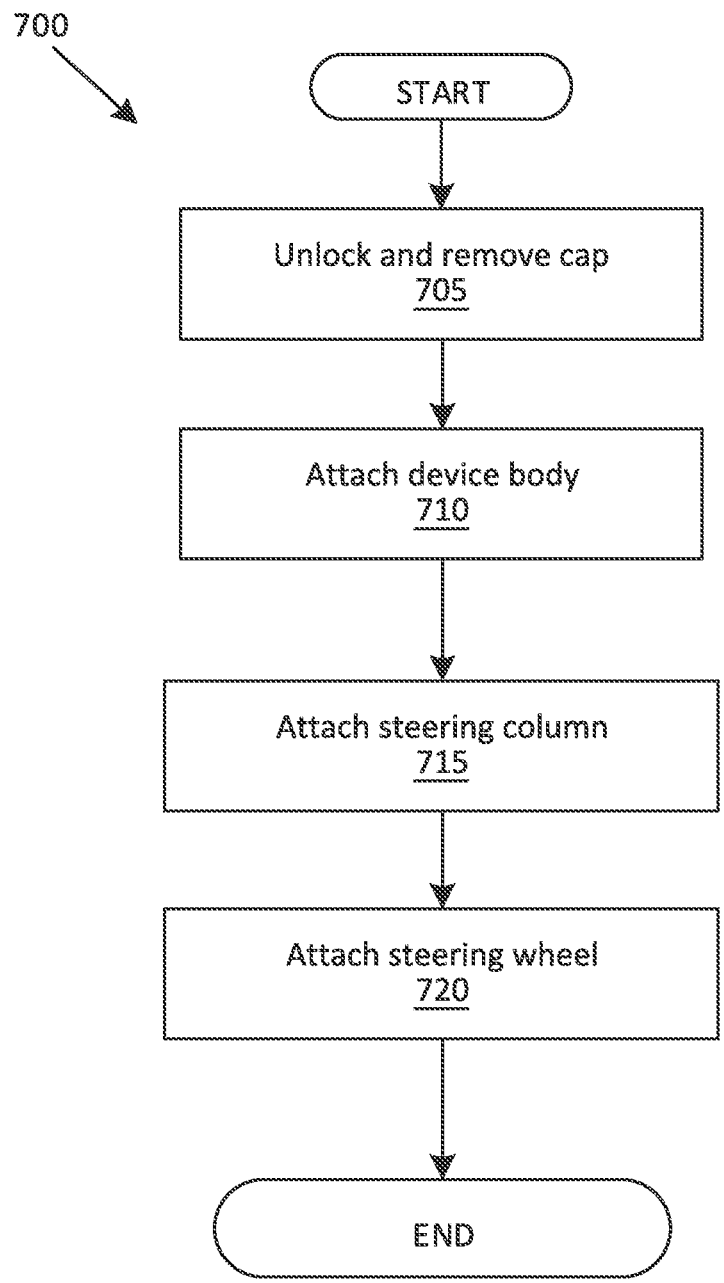
FIG. 7 is a flowchart of an example process for attaching the vehicle control device to the vehicle receptacle.

FIG. 7 is a flowchart of a process 700 for attaching the vehicle 100 control device 140 to the vehicle 100 receptacle 110.

The process 700 begins at a block 705, in which a user removes the cap 505. For example, the user may insert a key in the cap 505 lock 510 and rotate the key to unlock the cap 505. The user may remove the cap 505 by pulling the cap 505 away from the receptacle 110 opening 115. In one example, the cap 505 may include the end electric connector 520 and the vehicle 100 computer 210 may be programmed to detect a removal of the cap 505 from the receptacle 110. Additionally, upon determining that the cap 505 is removed, the vehicle 100 computer 210 may deactivate a vehicle 100 autonomous mode. Additionally or alternatively, the vehicle 100 computer 210 may output a request for a password to a vehicle 100 user interface 190. The vehicle 100 computer 210 may be programmed to activate a vehicle 100 non-autonomous mode upon receiving an expected password from the vehicle 100 user interface 190, e.g., inputted by the user. Additionally or alternatively, the vehicle 100 computer 210 may immobilize the vehicle 100, e.g., by deactivating a fuel injection to a vehicle 100 engine, upon receiving an unexpected password from the vehicle 100 user interface 190.

Next, in a block 710, the user attaches the control device 140 body 145 to the vehicle 100 receptacle 110. For example, the user may insert the control device 140 body 145 in the receptacle 110 cavity 112 and couple the body 145 mechanically and electrically with the receptacle 110. Additionally, upon attaching the control device 140 body 145 to the receptacle 110, the control device 140 second computer 240 may detect an electrical connection to, e.g., the vehicle 100 computer 210. As discussed above, the second computer 240 may communicate with the vehicle 100 computer 210, e.g., providing steering angle data, authentication data, etc.

Next, in a block 715, the user may releasably attach the steering column 175 to the steering wheel connector 160. In another example, the steering column 175 may be permanently attached to the body 145.

Next, in a block 720, the user may attach the steering wheel 165 to the steering column 175, e.g., rotationally via a steering angle sensor 180. The user can thereby steer, accelerate, and/or decelerate the vehicle 100, as explained above.

Following the block 720, the process 700 ends.

Figure 8:
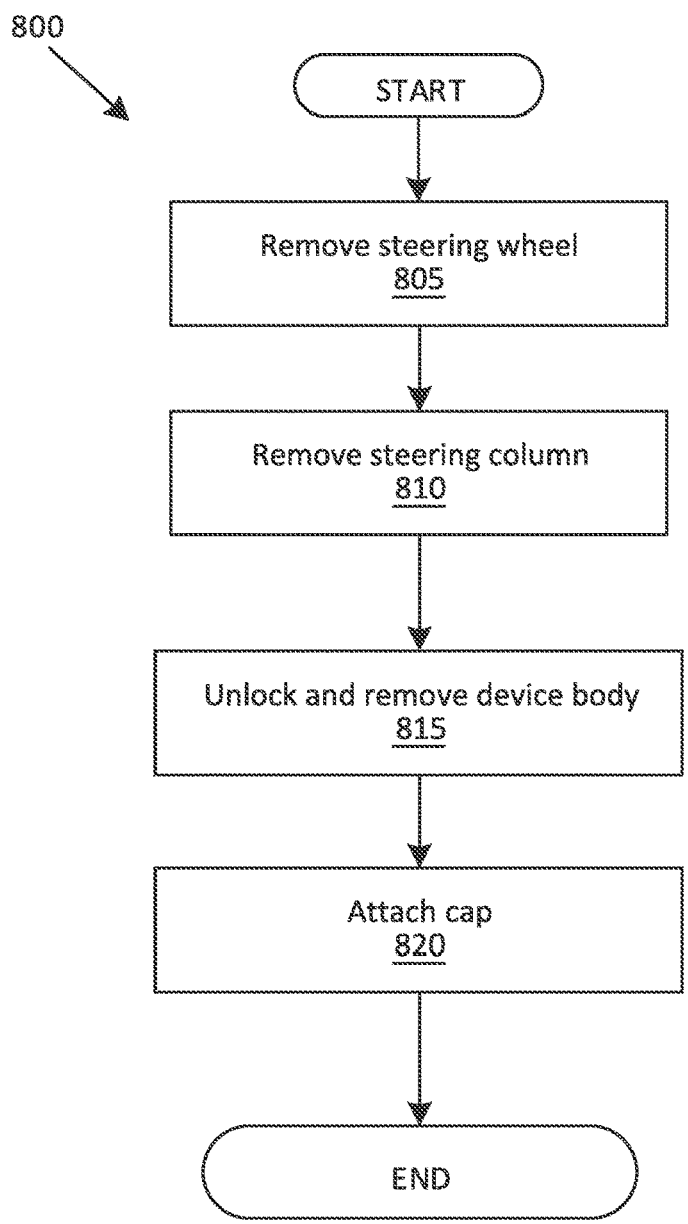
FIG. 8 is a flowchart of an example process for removing the vehicle control device from the vehicle receptacle.

FIG. 8 is a flowchart of a process 800 for removing the vehicle 100 control device 140 from the vehicle 100 receptacle 110. Additionally or alternatively, at least some of the steps may be executed in the same time and/or in a different order.

The process 800 begins at a block 805, in which a user removes the steering wheel 165 from the steering column 175. For example, the user may pull and release the steering wheel 165. In another example, the steering wheel 165 may be rotationally and permanently attached to the steering column 175. Additionally, the vehicle 100 computer 210 may be programmed to detect a removal of the steering wheel 165 by detecting a disruption of communication with, e.g., the steering angle sensor 180, user interface(s) 170, etc. For example, the vehicle 100 computer 210 may be programmed to receive a status data of the steering angle sensor 180 periodically, e.g., every 10 milliseconds. Thus, a removal of the steering wheel 165 may be detected when the vehicle 100 computer 210 does not receive the status data for an amount of time more than a predetermined threshold, e.g., 200 milliseconds. In one example, the computer 210 may be programmed to immobilize the vehicle 100 upon determining that the control device 140 steering wheel 165 is removed.

Next, in a block 810, the user removes the steering column 175 from, e.g., the steering wheel connector 160. For example, the user may unscrew or unclick the steering column 175. Alternatively, the steering column 175 may be permanently attached to the steering wheel connector 160.

Next, in a block 815, the user unlocks and/or removes the control device 140 body 145 from the receptacle 110, e.g., interior 115. For example, the user inserts a key in the control device 140 lock 150 and turns the lock 150 to pull the engagement pins 155 from the locking position to the unlocking position and pulls the body 145 away from the receptacle 110.

Next, in a block 820, the user attaches and/or locks the cap 505 to the receptacle 110. In one example, the user inserts the cap 505 and the cap 505 pins 610 are pushed into the receptacle 110 holes 130 to lock the cap 505. In another example, the user inserts the cap 505 and locks the cap 505 via a key. Thus, the user turns the key in the cap 505 lock 510 to move the cap 505 pins 610 to the locking position. Additionally, the vehicle 100 computer 210 may be programmed to detect an attaching of the cap 505 to the receptacle 110, e.g., via the electrical connections within a cap 505 end electric connector 520. Additionally, the vehicle 100 computer 210 may be programmed to activate a vehicle 100 autonomous mode upon determining that the cap 505 is attached to the receptacle 110.

Following the block 820, the process 800 ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system comprising a vehicle control device that includes:
    a body fittable to a vehicle receptacle;
    an engagement pin mounted to a side of the body, releasably lockable to a receptacle hole;
    a first electrical connector, mounted to a first end of the body, mateable to a second electrical connector, mounted to the receptacle, when the engagement pin is engaged;
    a steering wheel releasably and rotatably engagable by a second end of the body; and
    a vehicle control device computer programmed to detect an electrical connection to a vehicle computer via the first and second electrical connectors, and upon detecting the electrical connection to the vehicle computer, provide steering angle data and authentication data to the vehicle computer.

2. The system of claim 1, wherein an anchor of the receptacle is supported by a vehicle beam.

3. The system of claim 1, wherein a longitudinal axis of the receptacle is substantially parallel to a second longitudinal axis of the steering wheel.

4. The system of claim 1, further comprising a steering angle sensor, wherein the steering wheel is rotationally engagable by the second end of the body via the steering angle sensor.

5. The system of claim 1, further comprising a steering wheel connector mounted to the body second end, and a steering column releasably and rotatably mounting the steering wheel to the steering wheel connector.

6. The system of claim 1, wherein the pin is moveable from a locked position to an unlocked position.

7. The system of claim 1, wherein the vehicle control device computer is further programmed to:
    authenticate the vehicle control device to a vehicle computer; and
    output a steering angle to the vehicle computer.

8. The system of claim 1, further comprising a user input device, and the control device further comprising a processor that is programmed to receive user input for at least one of acceleration and braking, and to transmit a request to a vehicle computer to actuate the requested at least one of acceleration and braking.

9. The system of claim 1, further comprising a cap fittable to the receptacle.

10. The system of claim 9, wherein the cap includes:
    a cap pin, mounted to a cap body, releasably lockable to the receptacle hole; and
    a cap electrical connector engagable by the second electrical connector that is mounted to the receptacle.

11. The system of claim 10, wherein a vehicle computer is programmed to determine whether the receptacle is coupled to the cap by monitoring a connection of the cap electrical connector and the second electrical connector that is mounted to the receptacle.

12. The system of claim 11, wherein the vehicle computer is further programmed to determine whether the receptacle is coupled to the cap by outputting a voltage to the cap electrical connector and measuring a current flowing therethrough.

13. The system of claim 11, wherein a vehicle computer is programmed to deactivate a vehicle autonomous mode upon determining that the cap is disengaged from the receptacle.

14. A device, comprising:
    a body fittable to a vehicle receptacle;
    an engagement pin mounted to a side wall of the body, releasably lockable to a receptacle hole;
    a first electrical connector, mounted to a first end of the body, mateable to a second electrical connector, mounted to the receptacle, when the engagement pin is engaged;
    a steering wheel releasably and rotatably engagable by a second end of the body; and
    a device computer programmed to detect an electrical connection to a vehicle computer via the first and second electrical connectors, and upon detecting the electrical connection to the vehicle computer, provide steering angle data and authentication data to the vehicle computer.

15. The device of claim 14, further comprising a steering angle sensor, wherein the steering wheel is rotationally engagable by the second end of the body via the steering angle sensor.

16. The device of claim 14, further comprising a steering wheel connector mounted to the body second end, and a steering column releasably and rotatably mounting the steering wheel to the steering wheel connector.

17. The device of claim 14, wherein the engagement pin is moveable between a locked position and an unlocked position.

18. The device of claim 14, wherein the device computer is further programmed to:
    authenticate the device to a vehicle computer; and
    output a steering angle to the vehicle computer.

19. The device of claim 14, wherein the device computer is further programmed to receive user input for at least one of acceleration and braking, and to transmit a request to a vehicle computer to actuate the requested at least one of acceleration and braking.

20. The device of claim 14, wherein the steering wheel is releasably engagable by the second end of the body via a steering column.

* * * * *